United States Patent
Miller et al.

(10) Patent No.: US 9,531,199 B2
(45) Date of Patent: Dec. 27, 2016

(54) UNDERWATER CHARGING STATION

(71) Applicant: EAGLEPICHER TECHNLOGIES, LLC, Joplin, MO (US)

(72) Inventors: Gregory L. Miller, Diamond, MO (US); Michael A. Parrot, Joplin, MO (US); Jeffrey C. Dermott, Carthage, MO (US); Dharmesh Bhakta, Joplin, MO (US); Dennis Divine, Joplin, MO (US)

(73) Assignee: EaglePicher Technologies, LLC, Joplin, MO (US)

( * ) Notice: Subject to any disclaimer, the term of this patent is extended or adjusted under 35 U.S.C. 154(b) by 207 days.

(21) Appl. No.: 13/961,405

(22) Filed: Aug. 7, 2013

(65) Prior Publication Data

US 2014/0042975 A1     Feb. 13, 2014

Related U.S. Application Data

(60) Provisional application No. 61/680,518, filed on Aug. 7, 2012.

(51) Int. Cl.
| | |
|---|---|
| *H02J 7/00* | (2006.01) |
| *B63J 99/00* | (2009.01) |
| *B63C 11/52* | (2006.01) |
| *B63G 8/00* | (2006.01) |
| *H01M 2/10* | (2006.01) |

(Continued)

(52) U.S. Cl.
CPC .................. *H02J 7/00* (2013.01); *B63C 11/52* (2013.01); *B63G 8/001* (2013.01); *B63J 99/00* (2013.01); *H01M 2/1077* (2013.01); *H01M 6/30* (2013.01); *H01M 6/34* (2013.01); *H01M 6/5011* (2013.01); *H01M 6/5033* (2013.01); *H01M 10/46* (2013.01); *H01M 10/4207* (2013.01); *H01M 10/465* (2013.01); *H01M 16/00* (2013.01);

(Continued)

(58) Field of Classification Search
CPC ...... H01M 6/30; H01M 6/34; H01M 2220/20; H02J 7/004
USPC ... 320/101, 112, 127, 155; 429/52, 118, 119
See application file for complete search history.

(56) References Cited

U.S. PATENT DOCUMENTS 4,007,316 A * 2/1977 Koontz ......................... 429/118
4,012,234 A * 3/1977 Kraft .............................. 429/48

(Continued)

FOREIGN PATENT DOCUMENTS

| GB | 2 365 895 A | 2/2002 |
|---|---|---|
| GB | 2 453 645 A | 4/2009 |

OTHER PUBLICATIONS

May 9, 2014 International Search Report issued in International Patent Application No. PCT/US2013/053936.

(Continued)

*Primary Examiner* — Helen Rossoshek
(74) *Attorney, Agent, or Firm* — LSIP Law LLC; Linda Saltiel

(57) ABSTRACT

A submersible power supply apparatus provides the ability to provide power for recharging batteries used to operate underwater vehicles, manned and unmanned. A battery charging station apparatus containing at least one modular reserve battery magazine with a plurality of compartments is provided. A plurality of reserve battery modules may be respectively provided in the plurality of compartments, each of the plurality of reserve battery modules being configured to provide power when a reserve battery provided therein is activated.

20 Claims, 4 Drawing Sheets

(51) Int. Cl.
*H01M 10/46* (2006.01)
*H01M 6/30* (2006.01)
*H01M 6/34* (2006.01)
*H01M 6/50* (2006.01)
*H01M 10/42* (2006.01)
*H01M 16/00* (2006.01)

(52) U.S. Cl.
CPC .... *H01M 2010/4278* (2013.01); *H02J 7/0004* (2013.01); *H02J 7/0027* (2013.01)

(56) References Cited

U.S. PATENT DOCUMENTS

| | | | | |
|---|---|---|---|---|
| 5,360,678 | A * | 11/1994 | Spillman | H01M 2/0232 429/6 |
| 5,395,707 | A * | 3/1995 | McCarter et al. | 429/119 |
| 5,424,147 | A * | 6/1995 | Khasin et al. | 429/119 |
| 5,506,065 | A * | 4/1996 | Tribioli et al. | 429/119 |
| 5,532,079 | A * | 7/1996 | Tribioli et al. | 429/119 |
| 5,630,155 | A * | 5/1997 | Karaki | F03G 1/00 322/100 |
| 5,733,679 | A * | 3/1998 | Tucker et al. | 429/51 |
| 6,033,602 | A * | 3/2000 | Sunshine et al. | 252/511 |
| 6,647,912 | B1 * | 11/2003 | Rogers | 114/315 |
| 7,246,567 | B2 * | 7/2007 | Shelton et al. | 114/312 |
| 7,856,938 | B2 * | 12/2010 | Marion | B63B 43/12 114/312 |
| 8,854,013 | B2 * | 10/2014 | Gao et al. | 320/155 |
| 8,997,875 | B2 * | 4/2015 | Bennett et al. | 166/351 |
| 9,054,401 | B2 * | 6/2015 | Hopkins et al. | |
| 2003/0091895 | A1 * | 5/2003 | Zocchi | 429/118 |
| 2007/0002559 | A1 * | 1/2007 | Uke | F21L 4/00 362/157 |
| 2007/0042233 | A1 * | 2/2007 | Lyman | H01M 8/04567 429/9 |
| 2009/0095209 | A1 * | 4/2009 | Jamieson | 114/312 |
| 2009/0107388 | A1 * | 4/2009 | Crowell et al. | 114/336 |
| 2010/0121511 | A1 * | 5/2010 | Onnerud et al. | 701/22 |
| 2011/0215752 | A1 * | 9/2011 | Waters et al. | 320/101 |
| 2012/0082874 | A1 * | 4/2012 | Hungerford et al. | 429/52 |
| 2012/0113756 | A1 * | 5/2012 | Carcaterra et al. | 367/144 |
| 2012/0158229 | A1 * | 6/2012 | Schaefer | 701/22 |
| 2012/0293108 | A1 * | 11/2012 | Goto et al. | 320/101 |
| 2013/0058192 | A1 * | 3/2013 | Gateman | G01V 1/201 367/20 |
| 2013/0140899 | A1 * | 6/2013 | Tuukkanen | H02J 7/02 307/66 |
| 2013/0233232 | A1 * | 9/2013 | Crowell et al. | 114/336 |
| 2013/0323562 | A1 * | 12/2013 | Ferraro et al. | 429/112 |
| 2014/0000904 | A1 * | 1/2014 | Bennett et al. | 166/363 |
| 2014/0062382 | A1 * | 3/2014 | Riggs | 320/101 |
| 2014/0224167 | A1 * | 8/2014 | Gasparoni et al. | 114/321 |
| 2014/0335380 | A1 * | 11/2014 | Riggs | 429/9 |
| 2015/0027407 | A1 * | 1/2015 | Darnell | 123/399 |
| 2015/0204302 | A1 * | 7/2015 | Kalnay | F03B 13/1815 60/498 |
| 2015/0245519 | A1 * | 8/2015 | Forristall | H02J 7/0054 320/103 |

OTHER PUBLICATIONS

May 9, 2014 Written Opinion of the International Searching Authority issued in International Patent Application No. PCT/US2013/053936.

* cited by examiner

UNDERWATER CHARGING STATION

This non-provisional application claims the benefit of U.S. Provisional Application No. 61/680,518, filed Aug. 7, 2012.

FIELD OF INVENTION

The present invention relates to the subsea charging of batteries for underwater vehicles and applications, using battery energy supplied by the charging station.

BACKGROUND

This disclosure relates to underwater charging apparatus having multiple reserve battery modules to provide power in remotely accessible applications, and to their use. One example of such an application is to provide power (for example, backup power) for a subsea electrical power function such as in remote littoral zones where electrical power is needed for many purposes such as replenishing power via direct current to underwater craft (manned and unmanned, including military applications.)

Due to the energy needs required in subsea conditions for charging underwater vehicles, battery choice becomes a key factor. Over time, primary batteries degrade causing a decrease in the batteries' ability to hold a charge and to deliver the charge to a load. Due to the primary battery's state of activation, the battery will lose efficacy as the battery ages. Similarly, rechargeable batteries degrade over time. While rechargeable batteries have the ability to be recharged, these batteries lose their ability to hold the same amount of original charge as the battery ages and/or is used. Further, rechargeable batteries require knowledge that the battery needs to be recharged as well as the time/ability to recharge the battery. The invention is applicable to any electrical power function requiring the use of a battery that may degrade over time.

Due to the harsh environments encountered in subsea (including deepwater) applications such as salt water and high external pressure, subsea critical power applications require an electrical power source capable of ultrahigh reliability and ultralow maintenance and ease of remote replacement without bringing the device to the surface.

To increase the operational ranges and durations of underwater vehicles between charges, particularly those performing critical work or ones operating in remote or dangerous areas, it is desirable to have the ability to install underwater charging stations that effectively extend the vehicles' operability. This also optimizes vehicle battery life while enhancing overall vehicle efficiency and safety.

In view of the above, it is desirable to provide an electrical power source for diverse applications utilizing a plurality of reserve batteries that are easily and remotely replaceable.

SUMMARY

Reserve batteries are primary batteries which are inert until the battery is activated and used. More specifically, the active chemical components of a reserve battery are inactive until such time as the battery is needed, thus facilitating long storage life. Thus, reserve batteries are useful for applications requiring extended storage time because they avoid deterioration of the active materials during storage and eliminate the loss of capacity due to self discharge. Reserve batteries can be stored for 20 or more years and still provide full power when required.

It is thus desirable to provide a reserve battery system having reserve batteries that do not deteriorate when stored for long time periods so that the batteries will be immediately ready for use in critical situations.

The structure and operation of reserve batteries are described in more detail in U.S. application Ser. Nos. 13/735,480 and 13/760,746, the disclosures of which are hereby incorporated by reference herein.

It would be advantageous to provide an apparatus and method for providing power from reserve battery modules to power, for example, a subsea system. In a preferred embodiment, replaceable reserve battery modules are provided that are electrically connected to a control system of an apparatus that powers the charging station when the reserve batteries are activated. Thus, the reserve battery modules can be activated during critical situations when the normal power supply cannot supply adequate power to an apparatus. Furthermore, because the reserve battery modules are single-use devices, it would be advantageous to provide reserve battery modules that are adapted to be easily replaced in their environment of use, which, for example, can be a high-pressure, harsh subsea environment. In addition, due to different power requirements, it is also desirable to provide multiple reserve battery modules such that one or more reserve battery module can be activated as needed. Moreover, rechargeable batteries and recharging electronics may be provided in addition to the charging station's reserve batteries as supplementary or backup power.

Batteries are of a modular design such as a battery pack to accommodate replacement on the charging station or installing extra batteries.

Primary battery modules could be used as an option, in addition to reserve batteries.

To provide maximum flexibility in charging, especially in remote conditions or where charging access is limited, rechargeable batteries may be installed as an option for supplemental and/or backup power to the reserve batteries, thus providing additional power capabilities. Rechargeable chemistries, including nickel-hydrogen, lithium-ion, lead-acid, and nickel-cadmium electrochemistries, could be utilized in sealed, pressure-resistant, marine-grade housings. For example, batteries such as hermetically-sealed nickel-hydrogen cells and batteries have heritage providing reliable power for spacecraft in critical applications with environmental extremes where maintenance is not possible, offering multiple years of longevity. Similarly, lithium-ion batteries offer high energy output with low self-discharge, and little or no maintenance required. In an embodiment where rechargeable batteries are employed, the rechargeable batteries may be recharged via external sources that may include renewable energy such wave energy, wind, and solar.

In another embodiment, the underwater charging station may contain reserve batteries, primary batteries, and rechargeable batteries, alone or in any combination thereof.

The underwater charging station may be configured with a wide variety of external attachments to assist with charging vehicles underwater. For example, lighting could be added to assist in dimly-lit areas on the sea floor. In alternative embodiments, buoys, global positioning locators, or radio and sonar beacons may be provided to aid in locating a charging station. Attachments for anchoring and stability could be deployed to ensure that the charging station remains positioned properly on the seafloor. Various tethered attachments such as robotic arms, miniature UAVs, or other docking apparatus could assist in interfacing with vehicles, by means of assisting the craft with maneuvering to the charging station, or extending charging ability out beyond the charging station directly to the vehicle. Protective enclosures or shrouds may also be used as necessary.

Additionally, electrical panels for connecting vehicles to the charging station could offer a variety of connection means, using connectors of various types.

In addition to offering the ability to recharge underwater vehicles, the submersible power supply apparatus could be used for recharging or providing critical backup power for a variety of oceanic applications where reliable remote power is necessary, both underwater or at the surface. For example, recharging or backup power could be supplied to remotely-installed stationary marine equipment related to public safety, such as for instruments that monitor hurricanes and severe weather, or equipment to detect tsunamis, seismic activity, or pollution. Other potential applications may include providing power to scientific instruments used for gauging maritime environmental conditions pertaining to fields such as oceanography, meteorology, and climatology. Furthermore, variations of the charging station could be configured for use in undersea oil and natural gas drilling to provide charging to applicable equipment used in those industries. Military applications, such as those related to offshore defense or surveillance could also be utilized, in which case camouflage or security measures for the charging station could be used.

In accordance with one embodiment, a power supply apparatus is provided that has at least one modular reserve battery magazine that is provided with a plurality of compartments. A plurality of reserve battery modules respectively may be provided in corresponding ones of the plurality of compartments. Each of the plurality of reserve battery modules may be replaceable individually. Each of the plurality of reserve battery modules may be configured to provide power when a reserve battery provided therein is activated. Each reserve battery module of the plurality of reserve battery modules may include a sleeve and a reserve battery provided within the sleeve. The sleeve may be configured to fit within one of the plurality of compartments in a predetermined orientation. Each sleeve may be detachably connectable within any compartment of the plurality of compartments and may include electrical connections so that each reserve battery module of the plurality of reserve battery modules is separately replaceable while the underwater charging station apparatus remains remotely located.

In an exemplary embodiment, the charging station apparatus may include an electrically powered control system for controlling the charging station. The charging station apparatus may also include a communication unit that communicates when at least one reserve battery module of the plurality of reserve battery modules is activated. The communication unit may be configured to communicate with an external control unit to remotely control the electrically powered control system. The communication unit may also be configured to communicate an output power of an activated reserve battery module of the plurality of reserve battery modules. The electrically powered control system may activate a predetermined number of reserve battery modules depending on an amount of power required.

In another exemplary embodiment, the plurality of compartments in the at least one reserve battery magazine may include at least five compartments that are linearly aligned. The at least one reserve battery magazine may include a handle provided on one side surface thereof.

According to one aspect, a first reserve battery magazine may be attached to a base plate and at least one second reserve battery magazine may be attached to the first reserve battery magazine on a side opposite to the base plate in a stacked arrangement. Each of the one reserve battery magazines may be provided with one of a guide rail and a groove to facilitate stacking. The reserve battery magazines may be bolted together.

According to another aspect, the apparatus may include four reserve battery magazines that are stacked on top of each other to form an array of compartments, at least some of the compartments in the array having reserve battery modules disposed therein.

According to yet another aspect, an opening of each compartment may have a chamfered edge to facilitate installation of each sleeve within each compartment. Each sleeve may include a groove and an O-ring provided in the groove to lock each sleeve in place within the magazine compartment. In addition, each compartment may include a groove that aligns with the groove and O-ring provided on the sleeve when each reserve battery module is provided in the predetermined orientation. Each sleeve may also include a guide rail to facilitate positioning each sleeve within a corresponding magazine compartment in the reserve battery magazine. Each sleeve may have a chamfered edge to facilitate installation of each sleeve within each compartment. Each sleeve may be provided with a handle configured to be grasped by a robotic gripper.

According to yet another aspect, the reserve batteries in the plurality of reserve battery modules may be selected from a group including lithium alloy/iron disulfide thermal batteries, molten salt high temperature thermal batteries, silver zinc batteries, and lithium/oxyhalide batteries.

According to yet another aspect, each reserve battery module of the plurality of reserve battery modules may include an electric activation. Alternatively, each reserve battery module of the plurality of reserve battery modules may include a mechanical activations.

According to yet another aspect, the electrical connections may be waterproof, high-pressure resistant connections. The power supply apparatus may be provided in a system that is at least one of a point of load electrical power distribution, a hybrid power system, and a critical system.

In one aspect, a primary battery may be electrically coupled to the control system. The reserve batteries in each of the plurality of reserve battery modules may be backup batteries that are connected to the primary battery such that the reserve batteries are only utilized when the primary battery is not able to support power requirements.

In another embodiment, a method of providing backup power with a power supply apparatus is disclosed. The method may include replaceably electrically coupling at least one reserve battery module of a plurality of reserve battery modules in a respective compartment of at least one reserve battery magazine having a plurality of compartments, the at least one reserve battery magazine being provided in the power supply apparatus. The at least one reserve battery module may be configured to provide power when a reserve battery provided therein is activated. The at least one reserve battery module may include a sleeve and a reserve battery that is provided within the sleeve. The sleeve may be configured to fit within one of the plurality of compartments in a predetermined orientation. The sleeve may be detachably connectable within any compartment of the plurality of compartments and includes electrical connections so that the at least one reserve battery module is separately replaceable while the power supply apparatus remains remotely located.

According to one aspect, the method may include communicating when the at least one reserve battery module is activated. The method may also include receiving a command from an external control unit to remotely activate the at least one reserve battery module. Further, the method may include communicating an output power of an activated reserve battery module of the plurality of reserve battery modules. Furthermore, the method may include activating a predetermined number of reserve battery modules of the plurality of reserve battery modules depending on an amount of power required.

The submersible power supply apparatus may have multiple charging outputs in the form of connectors. Connector types may include waterproof D-type connectors, among other varieties applicable to underwater vehicles. Adapters to assist with interfacing may also be utilized. Optional umbilical connections to interface with underwater vehicles may be included additionally.

The submersible power supply apparatus' structure may be constructed of marine-grade materials. The structure may use attachment points for lowering and positioning the charging station onto the sea floor via ships, submersibles, or aircraft, with the option of retrieving the charging station.

The submersible power supply apparatus may be scalable in size, depending upon the anticipated power requirements and application requirements.

Optionally, telemetry from the submersible power supply apparatus may be monitored by underwater vehicles and/or installations for data and diagnostic information, transmitted via cables or wireless means.

As an option, electrical inverters may be installed for power conditioning purposes. Other components, used singularly or in combination, can include transformers and capacitors.

In an exemplary embodiment, two or more of these underwater charging stations may be electrically interconnected in the field, offering the ability to utilize a remote grid of multiple charging stations with an increased amount of available power for charging underwater vehicles.

Any number of various external attachments may be used in conjunction with the charging station to assist in underwater charging, including but not limited to lighting, global positioning transmitters, radio/sonar beacons, robotic arms, docking apparatus, and UAVs attached to the charging station for interfacing with other underwater vehicles to provide charging. Additionally, security and/or camouflaging features applicable to military applications may also be used.

Additionally, the underwater charging stations may be configured to interface with applications that are not underwater vehicles, including the ability to provide power for instruments and equipment on or anchored to the seafloor.

BRIEF DESCRIPTION OF THE DRAWINGS

Various exemplary embodiments of the disclosed underwater charging station apparatus and method will be described in detail with reference to the following drawings in which.

DETAILED DESCRIPTION OF THE EMBODIMENTS

Exemplary embodiments are provided of apparatus and methods for using reserve batteries to provide backup or supplemental power to, for example, subsea applications. The invention is applicable to numerous subsea applications including, for example, point of load electrical power distribution, hybrid power systems, and any critical system back-up such as, for example, for powering (or providing back-up power to) emergency blowout preventers. Thus, although an embodiment is described as used in a subsea application, the described embodiment is only exemplary. Other embodiments may be applicable to various emergency situations, long term storage situations, and situations requiring reliability of the battery/batteries.

Figure 1:
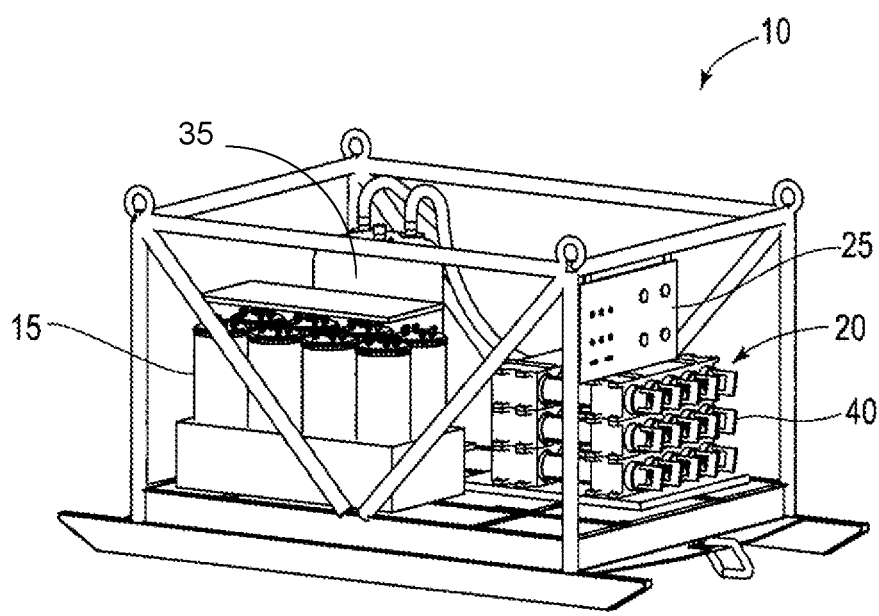
FIG. 1 illustrates a perspective view of a submersible power supply apparatus according to one embodiment.

FIG. 1 is a perspective view of the submersible power supply apparatus 10 according to one embodiment. As seen in FIG. 1, the submersible power supply apparatus 10 includes a plurality of reserve battery modules 40 in the reserve battery magazines 20, the reserve battery magazines 20 being stacked on top of each other. The submersible power supply apparatus 10 may optionally include primary or rechargeable battery modules 15. Furthermore, as seen in FIG. 1, the submersible power supply apparatus 10 includes an electrical interface panel 25 and control electronics 35 for monitoring and controlling the reserve battery modules 40.

It is preferable that the reserve battery modules 40 are individually detachable from and attachable to the reserve battery magazines 20, for example, via a ROV. It is also preferable that the reserve battery magazines 20 are detachable to and attachable from each other, for example, via the ROV. It is preferable to make the reserve battery modules 40 detachable/attachable (that is, replaceable) so that the reserve battery modules 40 can be replaced, for example, at the subsea location (for example, on the ocean floor). When the reserve battery modules 40 are used in a subsea application that will continue to operate even after the reserve battery modules 40 have been activated, it will be necessary to replace the spent reserve battery modules 40 with new ones after the old (spent) battery modules 40 have been activated. Thus, making the reserve battery modules 40 and reserve battery magazines 20 easily replaceable will avoid the need to remove the entire system powered by the power supply apparatus from the subsea location simply to replace the reserve batteries.

The reserve battery module 40 can be, for example, a lithium alloy/iron disulfide thermal battery, a molten salt high temperature battery (also called a thermal battery), a silver zinc battery, or a lithium/oxyhalide battery. In an embodiment, the reserve battery module 40 is a thermal battery. However, the reserve battery is not limited to a thermal battery. Instead, the reserve battery can include any electrochemical configuration that allows for the segregation of the active chemicals of the cell such that activation of the battery is required before the battery becomes functional. One example of a reserve battery can be found in U.S. Pat. No. 7,504,177, the disclosure of which is herein incorporated by reference in its entirety.

The reserve battery module 40 may be activated by an external input that causes the electrolyte, which is segregated from the other electrochemical components of the reserve battery, to be released. Upon release of the electrolyte and contact with the other electrochemical components of the reserve battery, the energy of the reserve battery module 40 is available for use. Because the reserve battery module 40 is not activated until needed, the reserve battery module 40 can be utilized in an emergency capacity.

The external input necessary to activate the reserve battery module 40 can be, for example, a short electrical pulse/trigger via an electrical activation (not shown) or a mechanical input via a mechanical activation (not shown). A discrete electrical connection that will provide the electrical energy for initiation of the reserve batteries may be used for an electrical activation. A push-button or a handle may be used for a mechanical activation. It is to be understood that the above-described methods for activation are not so limited and that any suitable means for electrical and/or mechanical activation may be used. When the reserve battery is a molten salt high temperature thermal battery, for example, the reserve battery module 40 is activated by igniting a pyrotechnic heat source within the battery using either the electrical activation or the mechanical activation.

The primary battery modules 15 may optionally include a primary battery or a rechargeable battery or both in combination with the reserve battery module 40. The rechargeable battery may be charged using power generated from alternative energy and/or power plants. The alternative energy may be generated using wind energy or tidal energy. In another embodiment, the reserve batteries may be configured to supply power to the rechargeable batteries and/or the primary batteries. In another embodiment, the reserve batteries may be configured to supply power to storage capacitors.

Figure 2:
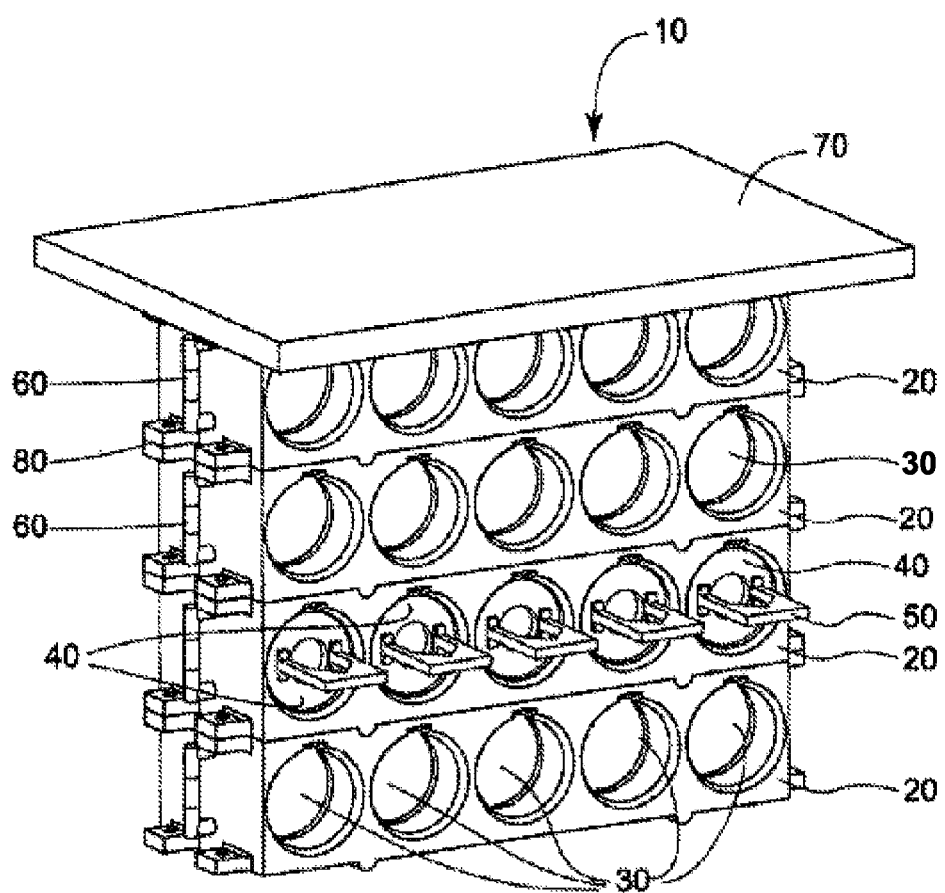
FIG. 2 illustrates a perspective view of reserve batteries of the submersible power supply apparatus according to one embodiment.

FIG. 2 is a perspective view of the reserve batteries of the submersible power supply apparatus 10 according to one embodiment. The submersible power supply apparatus 10 may include a plurality of modular reserve battery magazines 20 that may be stacked on top of one another (and remotely attached to each other). The reserve battery magazines 20 may be attached together by means of tab portions 80 provided on side surfaces of each of the reserve battery magazines 20. The tab portions 80 enable the reserve battery magazines 20 to be, for example, bolted together. As seen in FIG. 2, the lowermost reserve battery magazine 20 may be attached to a base plate 70. Each reserve battery magazine 20 includes a plurality of compartments 30. Each of the compartments 30 can receive a reserve battery module 40. In addition, each reserve battery magazine 20 may include a handle 60 that is provided on one side. The handles 60 are illustrated in FIG. 2 as being on the left side of each of the reserve battery magazines 60, but could be provided on the right side or on both sides. FIG. 2 illustrates reserve battery modules 40 provided in only one of the reserve battery magazines 20; however, reserve battery modules 40 can be provided in any or all of the compartments 30 illustrated in FIG. 2. FIG. 2 illustrates four reserve battery magazines 20 stacked on top of each other; however, the power supply apparatus 10 can include any number of reserve battery magazines 20 depending on the power needs of a particular application.

Figure 3:
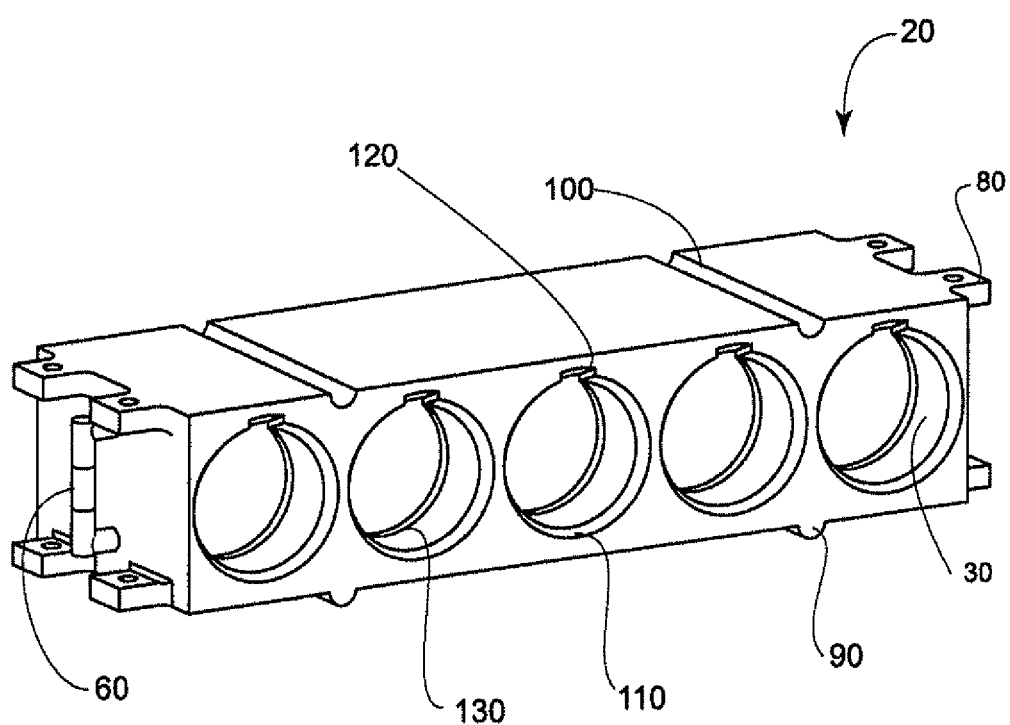
FIG. 3 illustrates one reserve battery magazine of the power supply apparatus according to one embodiment.

FIG. 3 illustrates a reserve battery magazine 20 according to one embodiment. As seen in FIG. 3, the reserve battery magazine 20 may have five compartments 30 each of which is configured to receive a reserve battery module 40. Each of the compartments 30 may include a chamfered edge 110 and a guide slot 120 to facilitate insertion and proper orientation of a reserve battery module 40 into each magazine compartment 30. Each magazine compartment 30 may also have a slot 130 (a ring-shaped slot or groove) that serves as a locking mechanism to secure a corresponding reserve battery module 40 in place. A top and bottom of each reserve battery magazine 20 may be provided with at least one guide rail 90 and at least one groove 100 to ensure that the reserve battery magazines 20 will be assembled and combined properly. The guide rail 90 may alternatively be provided on the top of the reserve battery magazine 20 and the groove 100 may be provided on the bottom. The reserve battery magazine 20 may formed of a polymer such as an acetyl copolymer or any other material that is suitable for the intended environment of use. The handle 60 illustrated in FIGS. 2 and 3 is provided to allow a remotely operated vehicle (ROV) (not shown) to latch onto each reserve battery magazine 20 when it is desirable to remove/replace at least one of the reserve battery magazine 20 or one or more reserve battery module 40 provided therein.

Figure 4:
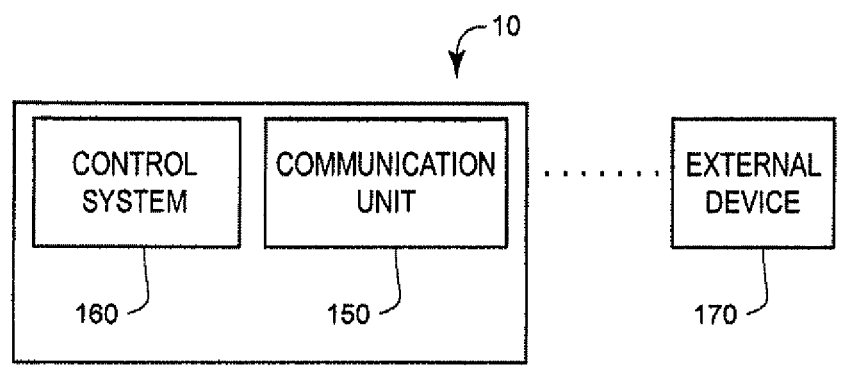
FIG. 4 illustrates a schematic diagram of how the submersible power supply apparatus and an external device communicate according to one embodiment.

FIG. 4 illustrates a schematic diagram of one example of how the power supply apparatus 10 may communicate with an external device. As seen in FIG. 4, the power supply apparatus 10 includes the control system 160 and a communication unit 150. The communication unit 150 may communicate via a wired or wireless communication to an external device 170. The control system 160 can selectively activate one or more reserve battery modules 40 depending on the amount of power needed. In addition, the control system 160 can, through the communication unit 150, indicate to the external device 170 when and how many reserve battery modules 40 have been activated. Moreover, the control system 160 can, through the communication unit 150, indicate an electrical performance of an activated reserve battery module 40. Further, the control system 160 can be controlled remotely by the external device 170.

It is desirable that the reserve battery magazines 20 and the reserve battery modules 40 be designed to withstand a front impact of an ROV of 8,500 lbs. traveling at 0.5 knots. In addition, it is desirable that the reserve battery magazines 20 and the reserve battery modules 40 can withstand a one time dropped object impact of 5 kJ over a 100 mm2 area.

The illustrated exemplary embodiments of the apparatus and method for providing a backup power system set forth above are intended to be illustrative and not limiting. Various changes may be made without departing from the spirit and scope of the invention.

What is claimed is:

1. A submersible power supply apparatus comprising:
   a reserve battery module;
   a modular reserve battery magazine having a compartment that houses the reserve battery module;
   a reserve battery disposed in the reserve battery module;
   at least one primary battery module;
   a rechargeable battery disposed in the at least one primary battery module; and
   an electrically powered control system for controlling the power supply apparatus, wherein the reserve battery module is configured to provide power under the condition that the reserve battery provided therein is activated by the electrically powered control system and the rechargeable battery provides back up for the reserve battery, wherein the rechargeable battery is recharged via one of an external source or an onboard battery source.

2. The submersible power supply apparatus according to claim 1, wherein the modular reserve battery magazine includes a plurality of compartments that house a plurality of reserve battery modules, and a plurality of reserve batteries each disposed in a corresponding one of the plurality of reserve battery modules.

3. The submersible power supply apparatus according to claim 1, further comprising:
a communication unit that communicates when at least one reserve battery module of the plurality of reserve battery modules is activated.

4. The submersible power supply apparatus according to claim 3, wherein the communication unit is configured to communicate with an external control unit to remotely control the electrically powered control system.

5. The submersible power supply apparatus according to claim 3, wherein the communication unit is configured to communicate an electrical performance of an activated reserve battery module of the plurality of reserve battery modules.

6. The submersible power supply apparatus according to claim 3, wherein the electrically powered control system activates a predetermined number of reserve battery modules depending on an amount of power required.

7. The submersible power supply apparatus according to claim 1, wherein the power supply apparatus is provided as part of a subsea system, wherein the subsea system includes at least one of manned vehicles, unmanned underwater vehicles, distributed energy storage, and point-of-load energy storage.

8. The submersible power supply apparatus according to claim 1, wherein the reserve battery in the reserve battery modules is selected from a group including lithium alloy/iron disulfide thermal batteries, molten salt high temperature thermal batteries, silver zinc batteries, and lithium/oxyhalide batteries.

9. The submersible power supply apparatus according to claim 1, wherein the reserve battery module includes an electrical activation.

10. The submersible power supply apparatus according to claim 1, wherein the reserve battery module includes a mechanical activation.

11. The submersible power supply apparatus according to claim 1, further comprising a reserve battery which is a primary battery, wherein the primary battery may be either activated or inactivated.

12. The submersible power supply apparatus according to claim 1, wherein the external source comprises at least one of wave energy, wind energy, and solar energy.

13. The submersible power supply apparatus according to claim 1, wherein the power supply apparatus is provided in a system that is at least one of a point of load electrical power distribution, a hybrid power system, and a critical system.

14. The submersible power supply apparatus according to claim 1, wherein the power supply apparatus is provided in a subsea system that is disposed on a seafloor.

15. The submersible power supply apparatus according to claim 1, wherein the power supply apparatus is provided as part of a subsea system, wherein the subsea system provides operational power to connected vehicles or stationary or mobile subsea devices.

16. The submersible power supply apparatus according to claim 1, further comprising:
one or more primary batteries.

17. The submersible power supply apparatus according to claim 1, wherein the reserve battery provides back up for the rechargeable battery.

18. The submersible power supply apparatus according to claim 1, wherein the submersible power supply apparatus is configured such that either the reserve battery provides back up for the rechargeable battery or the rechargeable battery provides back up for the reserve battery.

19. The submersible power supply apparatus according to claim 1, further comprising one or more primary batteries, wherein the one or more primary batteries provide backup for the rechargeable battery or the reserve battery or a combination thereof.

20. The submersible power supply apparatus according to claim 1, further comprising one or more primary batteries, wherein the rechargeable battery is recharged via the one or more primary batteries.

* * * * *